US009775085B2

United States Patent
Kalapatapu et al.

(10) Patent No.: US 9,775,085 B2
(45) Date of Patent: Sep. 26, 2017

(54) NETWORK DISCOVERY AND SELECTION USING UTILITY INFORMATION AND RADIO INTERWORKING

(71) Applicant: Avago Technologies General IP (Singapore) Pte. Ltd., Singapore (SG)

(72) Inventors: Dutt Kalapatapu, Santa Clara, CA (US); Florin Baboescu, San Diego, CA (US); Kamesh Medapalli, San Jose, CA (US); Farouk Belghoul, Campbell, CA (US); Ahmad Rahmati, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 276 days.

(21) Appl. No.: 14/245,761

(22) Filed: Apr. 4, 2014

(65) Prior Publication Data

US 2015/0289185 A1    Oct. 8, 2015

Related U.S. Application Data

(60) Provisional application No. 61/809,153, filed on Apr. 5, 2013, provisional application No. 61/824,796, filed
(Continued)

(51) Int. Cl.
*H04L 12/26* (2006.01)
*H04W 36/22* (2009.01)
*H04W 28/08* (2009.01)
*H04W 48/16* (2009.01)
*H04W 88/06* (2009.01)

(52) U.S. Cl.
CPC .......... *H04W 36/22* (2013.01); *H04W 28/08* (2013.01); *H04W 48/16* (2013.01); *H04W 88/06* (2013.01)

(58) Field of Classification Search
CPC ............. G06F 9/45533; G06F 9/45541; G06F 9/45545; G06F 9/45554; G06F 9/45558; G06F 3/0659; G06F 5/065; G06F 5/10; G06F 5/12; G06F 5/16; G06F 7/785
See application file for complete search history.

(56) References Cited

U.S. PATENT DOCUMENTS

2011/0171953 A1* 7/2011 Faccin .................. H04W 48/08
455/426.1
2011/0317571 A1* 12/2011 Kokkinen ............. H04W 24/00
370/252
(Continued)

*Primary Examiner* — Alvin Zhu
(74) *Attorney, Agent, or Firm* — Sterne, Kessler, Goldstein & Fox P.L.L.C.

(57) ABSTRACT

A communication device and method for offloading communications from a first communication network to a second communication network. The offloading decision can be based on one or more utility values and/or one or more utility sum values. The utility values and/or utility sum values can be defined in a communication framework. The communication framework can be, for example, Access Network Discovery and Selection Function (ANDSF) framework. The offloading of communication can be from a Long-term Evolution (LTE) network to a wireless local area network (WLAN), or vice-versa. The communication framework can include, for example, utility, utility sum, positional, movement, signal quality, connection duration, data rate, and/or quality of service (QoS) parameters.

20 Claims, 7 Drawing Sheets

Related U.S. Application Data on May 17, 2013, provisional application No. 61/818,156, filed on May 1, 2013.

(56) References Cited

U.S. PATENT DOCUMENTS

| | | | |
|---|---|---|---|
| 2013/0028172 A1* | 1/2013 | Lim | H04W 36/12 370/315 |
| 2013/0053013 A1* | 2/2013 | Giaretta | H04W 52/02 455/418 |
| 2013/0079054 A1* | 3/2013 | Jouin | G06F 3/1438 455/552.1 |
| 2013/0111038 A1* | 5/2013 | Girard | H04L 69/16 709/226 |
| 2013/0242965 A1* | 9/2013 | Horn | H04W 24/10 370/338 |
| 2014/0226487 A1* | 8/2014 | Forssell | H04W 36/22 370/235 |
| 2015/0215832 A1* | 7/2015 | Fitzpatrick | H04W 48/18 455/426.1 |

* cited by examiner

NETWORK DISCOVERY AND SELECTION USING UTILITY INFORMATION AND RADIO INTERWORKING

CROSS REFERENCE TO RELATED APPLICATIONS

This patent application claims the benefit of U.S. Provisional Patent Application No. 61/809,153, filed Apr. 5, 2013, entitled "3GPP Air-Interface Radio Signaling Enhancement For WLAN/3GPP Radio Interworking Using A Query Interface," U.S. Provisional Patent Application No. 61/824,796, filed May 17, 2013, entitled "Communications System With Access Network Discovery And Selection Function (ANDSF) Rule Conflict Resolution Using Utility Maximization," and U.S. Provisional Patent Application No. 61/818,156, filed May 1, 2013, entitled "WLAN Connection Status Signaling to Cellular Network to Enable Cellular Network To WLAN Offloading," each of which is incorporated herein by reference in its entirety.

BACKGROUND

Field

This application relates generally to wireless communications, including inter-system offloading and radio interworking within a communication environment.

Related Art

The cellular network industry and service providers have been developing inter-system offloading solutions to alleviate congestion within communication environments by delivering data originally targeted for cellular networks to one or more other complementary technologies such as wireless local area networks (WLAN). Inter-system offloading can reduce congestion issues and provide flexible bandwidth for load-balancing.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
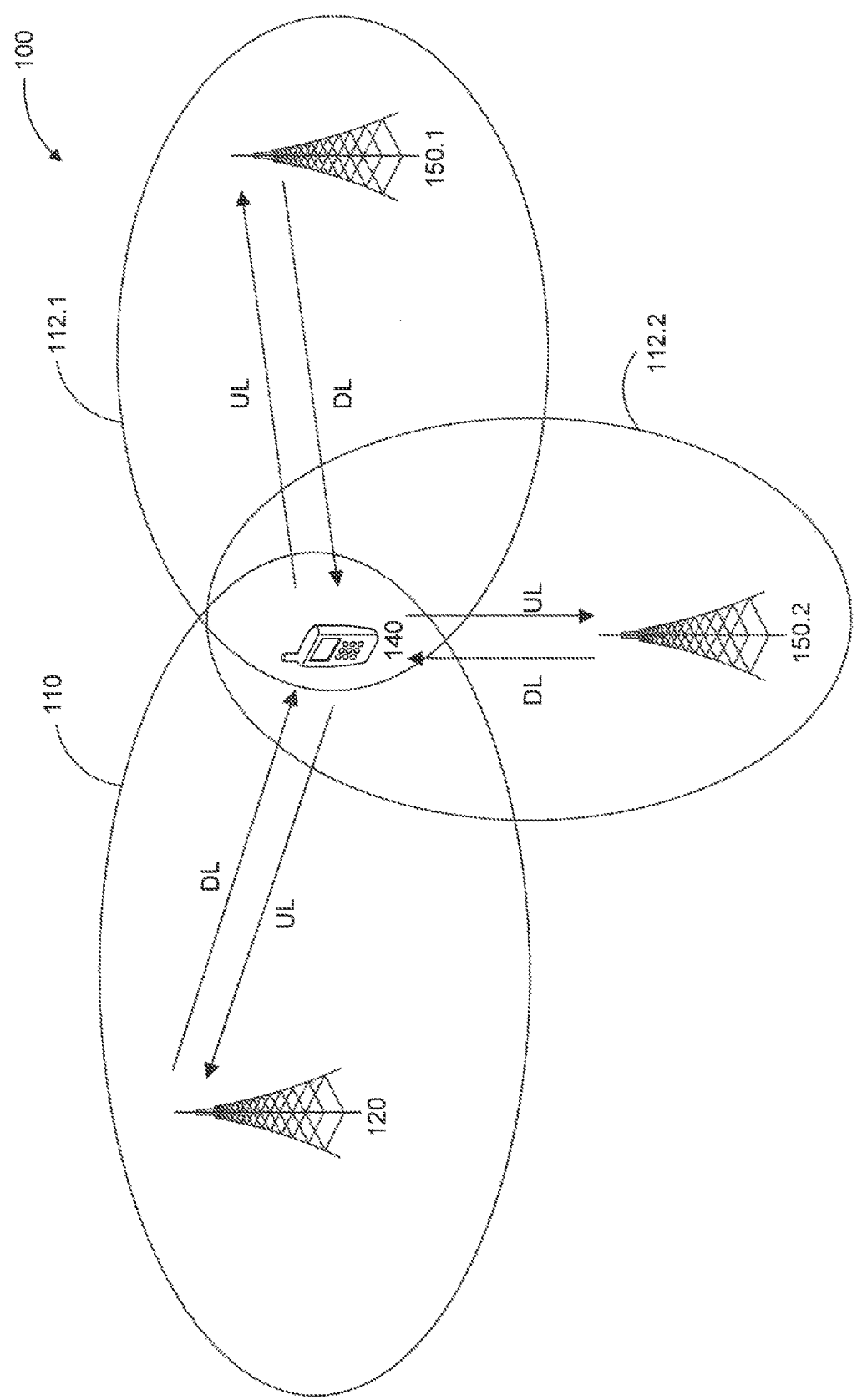
FIG. 1 illustrates an example network environment.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specification and International Mobile Telecommunications-2000 (IMT-2000) standard, all of which are incorporated by reference in their entirety. Further, 3GPP refers to a communication network as a UTRAN (Universal Mobile Telecommunication System (UMTS) Terrestrial Radio Access Network, a E-UTRAN (Evolved UTRAN), and/or a GERAN (Global System for Mobile Communications (GSM) Enhanced Data rates for GSM Evolution (EDGE) Radio Access Network) to provide some examples.

Although exemplary embodiments are described with reference to LTE, the more generic terms "mobile device" and "base station" are used herein except where otherwise noted to refer to the LTE terms "User Equipment (UE)" and "eNodeB/eNB," respectively. Further, the embodiments are not limited to implementation in LTE, as other communication standards could be used, as will be understood by those skilled in the arts.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) WLAN (IEEE 802.11), Bluetooth (IEEE 802.15.1 and Bluetooth Special Interest Group (SIG)), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

For the purposes of this discussion, the term "processor circuitry" shall be understood to be one or more circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

FIG. 1 illustrates an example communication environment 100 that includes one or more base stations 120, one or more mobile devices 140, and one or more access points (AP)s 150. The base station(s) 120, mobile device(s) 140, and AP(s) 150 each include one or more processors, circuitry, and/or logic that is configured to communicate via one or more wireless technologies. The one or more processors can include (and be configured to access) one or more internal and/or external memories that store instructions and/or code that, when executed by the processor(s), cause the processor(s) to perform one or more operations to facilitate communications via one or more wireless technologies as discussed herein. Further, one or more of the mobile devices 140 can be configured to support co-existing wireless communications. The mobile device(s) 140 can include, for example, a transceiver having one or more processors, circuitry, and/or logic that is configured to transmit and/or receive wireless communications via one or more wireless technologies within the communication environment 100. The base station(s) 120 and AP(s) 150 each include one or more processors, circuitry, and/or logic that is configured to: (1) receive one or more wired communications via one or more well-known wired technologies (e.g., within a core (backhaul) network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include, for example, one or more wireless protocols discussed above. The number of mobile devices 140, base stations 120 and/or APs 150 are not limited to the numbers shown in the exemplary embodiment illustrated in FIG. 1, and the communication environment 100 can include any number of mobile devices 140, base stations 120 and/or APs 150 as would be understood by those skilled in the relevant arts without departing from the spirit and scope of the present disclosure.

The mobile device 140 can be configured to communicate with the base station 120 in a serving cell or sector 110 of the communication environment 100, to communicate with the access point (AP) 150.1 in a wireless local area network (WLAN) 112.1, and/or to communicate with the AP 150.2 in a WLAN 112.2. For example, the mobile device 140 receives signals on one or more downlink (DL) channels and transmits signals to the base station 120, AP 150.1 and/or the AP 150.2 on one or more respective uplink (UL) channels.

In exemplary embodiments, the mobile device 140 can be configured to utilize the Access Network Query Protocol (ANQP) to exchange information with the APs 150. Further, one or more of the APs 150 can be Hotspot 2.0 compliant, as defined in the IEEE 802.11u standard. In these examples, the mobile device 140 can be configured to exchange backhaul bandwidth and/or data rate information, connectivity information, capability information, and any other connection and/or communication information associated with the AP(s) 150 as would be understood by those skilled in the relevant arts utilizing the ANQP.

In exemplary embodiments having more than one mobile device 140, one or more of the mobile devices 140 can be configured to establish a device-to-device communication environment with one or more other mobile devices 140, and to establish device-to-device communications with the one or more other mobile devices 140. In this example, the device-to-device communication environment can be utilized, for example, to offload one or more 3GPP and/or non-3GPP communications with the one or more other mobiles devices 140 via the base station 120 and/or APs 150 to the device-to-device communication environment. In an exemplary embodiment, communications will be exchanged directly between the mobile devices 140 instead of routing the communications over the LTE access network and/or WLAN access network. That is, in an exemplary embodiment, the device-to-device communications bypass any base stations and/or access points within the communication environment 100 and/or outside of the communication environment 100. The establishment of device-to-device communication environments and device-to-device communications utilizing the device-to-device communication environments is described in more detail in U.S. patent application Ser. No. 14/213,826, filed Mar. 14, 2014, entitled "Communication Network Having Proximity Service Discovery And Device Self-Organization," which is incorporated herein by reference in its entirety.

In exemplary embodiments of the present disclosure, and as discussed in detail below, the communication environment 100 can utilize inter-system offloading between 3GPP and non-3GPP access networks. For example, the communication environment 100 can be configured to offload wireless communications within a Long-Term Evolution (LTE) access network to a wireless local area network (WLAN), offload wireless communications within a WLAN to a LTE access network, or a combination of both. In these examples, the mobile device 140 can be configured to offload one or more communications from a 3GPP access network to a non-3GPP access network, from a non-3GPP access network to a 3GPP access network, or a combination of both. For example, the mobile device 140 can be configured to offload one or more communication within a LTE access network to a WLAN access network.

In exemplary embodiments, the offloading can be based on priority information associated with one or more of the base station(s) 120 and/or AP(s) 150. The priority information can include one or more priority values, which can be used to rank the base station(s) 120 and/or AP(s) 150 by giving the highest ranking to the base station(s) 120 and/or AP(s) 150 having the lowest priority value. Further, the priority values associated with the base station(s) 120 and/or AP(s) 150 can correspond to one or more applications in which the mobile device 140 is configured to perform. For example, the base station 120 can include a first priority value associated with a voice call application and a second priority value associated with a background synchronization application to provide some examples. Exemplary priority values and corresponding applications are shown below in Table 1.

TABLE 1

| Application Type | Application Examples | Priority Value | | |
| --- | --- | --- | --- | --- |
| | | LTE Network | WLAN A (AP 150.1) | WLAN B (AP 150.2) |
| Voice call | RCS Voice | 20 | 10 | 90 |
| Background | Download, synchronization | 900 | 500 | 200 |
| Push | Notifications, Instant Message, email | 2000 | 1100 | 1000 |

In utilizing priority information, the mobile device 140 can be configured to offload communications from, for example, the base station 120 to one of the APs 150 having, for example, a lowest priority value of the available APs 150. In exemplary embodiments where the priority values are further associated with mobile device applications, the mobile device 140 can be configured to offload communications from, for example, the base station 120 to one of the APs 150 having, for example, a lowest priority value of the available APs 150 for the desired application. For example, the mobile device 140 can be configured to offload from the base station 120 to the AP 150.2 for a voice call application as the AP 150.2 has the lowest priority value (e.g., 90) associated with voice call applications. In exemplary embodiments, the priority information can be defined in one or more offloading policies provided to the mobile device 140. The one or more offloading polices can be provided to the mobile device 140 by, for example, one or more service providers of the 3GPP and/or non-3GPP networks.

In exemplary embodiments, the offloading can be based on utility information associated with one or more of the base station(s) 120 and/or AP(s) 150. The utility information can include one or more utility values corresponding to one or more respective applications. A utility value is an integer within a fixed range (e.g., 0-1000) that quantizes the importance of an offloading policy for the network service provider. The utility values can be used to rank the base station(s) 120 and/or AP(s) 150 to assist in determining which of the base station(s) 120 and/or AP(s) 150 are to be used for the offloading of communications. Base station(s) 120 and AP(s) 150 can be associated with one or more utility values that correspond to one or more applications supported by the base station(s) 120 and/or AP(s) 150. Exemplary utility values and corresponding applications are shown below in Table 2.

As shown in Table 2, the LTE network associated with base station 120 includes utility values of 80, 10, and 10, which correspond to a voice call application, a background application, and a push application, respectively. The AP 150.1 and AP 150.2 have utility values of 90, 30, and 20, and 10, 50, and 20, which respectively correspond to the voice call application, the background application, and the push application. In this example, the utility values can be used to rank the various base station(s) 120 and/or AP(s) 150 for one or more of the applications. For example, for the voice call application, the base stations/APs can be ranked as follows: AP 150.1 (90), base station 120 (80) and AP 150.2 (10). Similarly, for the background application, the base stations/APs can be ranked as follows: AP 150.2 (50), AP 150.1 (30), and base station 120 (10). That is, while the WLAN supported by the AP 150.1 has the highest rank for voice call applications, the AP 150.1 has the second highest ranking for background applications.

In utilizing utility information, the mobile device 140 can be configured to offload communications from, for example, the base station 120 to one of the APs 150 having, for example, a highest utility value for a desired application. For example, if the mobile device 140 is currently connected to the LTE network and would like to perform a voice call, the mobile device 140 can be configured to offload communications to the WLAN network supported by the AP 150.1 as this WLAN has a utility value (e.g., 90) that is higher than the utility value for voice call applications (e.g., 80) associated with the WLAN network supported by AP 150.2. Similarly, if the mobile device 140 would like to utilize a background application, the mobile device 140 can be configured to offload communications to the WLAN supported by the AP 150.2 because the utility value of this WLAN (e.g., 50) is larger than the utility values of the LTE network (e.g., 10) and the WLAN supported by the AP 150.1

TABLE 2

| Application Type | Example Applications | Utility Values | | |
| --- | --- | --- | --- | --- |
| | | LTE network | WLAN A (AP 150.1) | WLAN B (AP 150.2) |
| Voice call | RCS Voice | 80 | 90 | 10 |
| Background | Download, synchronization | 10 | 30 | 50 |
| Push | Notifications, Instant Message, email | 10 | 20 | 20 |

In exemplary embodiments, the utility values are determined by one or more service providers associated with the base station(s) 120 and/or AP(s) 150 and provided to the mobile devices 140. Further, in exemplary embodiments, the mobile device(s) 140 can be configured to gather information corresponding to AP(s) 150 and/or base station(s) 120 and provide the gathered information to one or more service providers, which may utilize the information to determine the utility values (and/or utility sum values discussed below).

(e.g., 30) for background applications. In exemplary embodiments, the utility information can be defined in one or more offloading policies provided to the mobile device 140. The one or more offloading polices can be provided to the mobile device 140 by, for example, one or more service providers of the 3GPP and/or non-3GPP networks.

In exemplary embodiments, the mobile device 140 can be configured to simultaneously utilize two or more applications, where the two or more applications can be of the same or different application types. In these examples, the mobile device 140 can be configured to offload communications based on two or more utility values associated with the simultaneously-active applications. Here, the mobile device 140 can be configured to: (1) not offload communications associated with any of the utilized applications; (2) not offload communications associated with one or more applications while offloading communications associated with one or more of the applications; or (3) offload communications associated with all of the utilized applications.

For the purposes of this example, the mobile device 140 is configured to connect to one WLAN network at a given time. Therefore, in determining whether to offload communications from the LTE network, the mobile device 140 can determine to not offload communications to any of the WLAN networks, to offload a portion of the communications to one of the WLAN networks, or to offload all the communications to one of the WLAN networks. It should be appreciated that the mobile device 140 should not be limited to single WLAN connections, and the mobile device 140 can be configured to connect to two or more different WLAN networks without departing for the spirit and scope of the present disclosure. For example, the mobile device 140 can be configured with two or more WLAN transceivers which can be configured to simultaneously connect to two or more different WLAN networks.

In an exemplary embodiment, the mobile device 140 can be configured to generate utility sum values by taking the sum of the utility values for two or more applications associated with the base station(s) 120 and/or AP(s) 150. For example, when the mobile device 140 is utilizing a voice call application, a background synchronization application, and a push application, the mobile device 140 can be configured to generate a first utility sum value for these applications that is associated with the base station 120, a second utility sum value for these applications that is associated with the AP 150.1, and a third utility sum value for these applications that is associated with the AP 150.2. Further, the utility sum values can be formed from a combination of applications associated with different communication networks. For example, a combination of utility values can be selected from, for example, the LTE network and a WLAN to generate a utility sum value (e.g., utility sum value of 150 shown below includes utility sum values from LTE and WLAN B). In this example, in generating utility sum values, a comparison of the utility sum values resulting from the various combinations of utility values for various communications networks can be performed to select the appropriate combination of networks to support the utilized applications. In an exemplary embodiment, the mobile device 140 is configured to generate the utility sum values for the corresponding base station(s) 120 and/or AP(s) 150 based on the utility values, which may include a combination of utility values corresponding to the base station(s) 120 and/or AP(s) 150. Exemplary utility sum values for the corresponding base station 120 and APs 150 are shown below in Table 3.

TABLE 3

| WLAN selection | Network/Utility from application | | | Utility Sum Value |
| --- | --- | --- | --- | --- |
| | Voice call (RCS Voice) | Background (download, sync.) | Push (Notifications, IM) | |
| None (BS 120 Only) | LTE, 80 | LTE, 10 | LTE, 10 | 100 |
| WLAN A (AP 150.1) | WLAN A, 90 | WLAN A, 30 | WLAN A, 20 | 140 |

TABLE 3-continued

| WLAN selection | Network/Utility from application | | | Utility Sum Value |
| --- | --- | --- | --- | --- |
| | Voice call (RCS Voice) | Background (download, sync.) | Push (Notifications, IM) | |
| WLAN B (AP 150.2) | LTE, 80 | WLAN B, 50 | WLAN B, 20 | 150 |

In exemplary embodiments, the mobile device 140 is configured connect to the base station 120 and one of the AP 150.1 and AP 150.2. For example, as illustrated in Table 3, the utility sum value is 100 when the mobile device 140 is only connected to the LTE network of the base station 120 (e.g., scenario 1). Similarly, when the mobile device 140 is connected to the base station 120 and AP 150.1 (e.g., scenario 2), the utility sum value is 140. When connected to the base station 120 and AP 150.2 (e.g., scenario 3), the utility sum value is 150.

In an exemplary embodiment, the mobile device 140 is configured to offload communications associated with one or more applications to a second network while maintaining (i.e., not offloading) communications for one or more application on the first network. This is illustrated in the exemplary scenario when the mobile device 140 is connected to the AP 150.2 in addition to the base station 120 (e.g., scenario 3). In this example, and as shown in Table 2, the utility values for voice call applications for the AP 150.2 and the base station 120 are 10 and 80, respectively. Because the LTE network of the base station 120 offers a better quality of service for voice call applications when compared to the AP 150.2 (e.g., 80>10), the mobile device 140 can be configured to offload applications for background and push applications to the AP 150.2 while maintaining the voice call application on the base station 120. This configuration results in a utility sum value of 150, which is the largest utility sum value of the three scenarios. That is, when the mobile device 140 is utilizing voice call applications, background applications, and push applications, this configuration should result in a better quality of service based on the ranking of the utility sum values.

In exemplary embodiments, when the applications being utilized by the mobile device 140 change, the mobile device 140 can be configured to recalculate the utility sum values for the newly-utilized applications for the base station(s) 120 and/or AP(s) 150. That is, the ranking of the base station(s) 120 and/or AP(s) 150 can be dynamically adjusted based on the current number of applications being utilized and their corresponding utility sum values. For example, when the mobile device 140 is utilizing voice call applications and push applications, the mobile device 140 can be configured to recalculate utility sum values for the base station 120 and APs 150 based on corresponding utility values for these applications. Exemplary utility sum values are shown below in Table 4.

TABLE 4

| WLAN selection | Network/Utility from application | | Utility Sum Value |
| --- | --- | --- | --- |
| | Voice call (RCS Voice) | Push (Notifications, IM) | |
| None (BS 120 Only) | LTE, 80 | LTE, 10 | 90 |
| WLAN (AP 150.1) | WLAN B, 90 | WLAN B, 20 | 110 |
| WLAN (AP 150.2) | LTE, 80 | WLAN C, 20 | 100 |

With reference to Table 4, the utility sum value is 90 when the mobile device 140 is only connected to the LTE network of the base station 120 (e.g., scenario 1). Similarly, when the mobile device 140 is connected to the base station 120 and AP 150.1 (e.g., scenario 2), the utility sum value is 110. When connected to the base station 120 and AP 150.2 (e.g., scenario 3), the utility sum value is 100. In this example, by comparing the utility sum values of the three scenarios, the mobile device 140 can determine that best quality of service should be realized by offloading both the communications associated with the voice call application and the communications associated with the push applications to the WLAN supported by the AP 150.1.

Those skilled in the relevant art(s) will understand that the inter-system offloading is not limited to offloading between 3GPP and non-3GPP access networks, and the offloading can include offloading between a first 3GPP access network and a second 3GPP access network, between a first non-3GPP access network and a second non-3GPP access network, and/or a combination of both. Further, for the purpose of this discussion, inter-system offloading is described from the perspective of offloading communication from the base station 120 to one of the APs 150. However, it will be understood by those skilled in the relevant art(s) that the offloading is not limited to this perspective and that communications can be offloaded from the APs 150 to the base station 120.

In an exemplary embodiment, one or more of the base stations 120 includes one or more processors, circuitry, and/or logic that is configured for communications conforming to 3GPP's Long-Term Evolution (LTE) specification (e.g., the base station is an LTE base station), one or more of the APs 150 includes one or more processors, circuitry, and/or logic that is configured for communications conforming to IEEE's 802.11 WLAN specification (e.g., the AP 150 is a WLAN access point), and one or more of the mobile devices 140 include one or more processors, circuitry, and/or logic that is configured for communications conforming to 3GPP's LTE specification and IEEE's 802.11 WLAN specification. The one or more processors, circuitry, and/or logic of the mobile device 140 can be further configured for communications conforming to one or more other 3GPP and/or non-3GPP protocols via one or more device-to-device communication networks established with one or more other mobile devices. That is, the mobile device(s) 140 are configured to wirelessly communicate with the base station(s) 120 utilizing 3GPP's LTE specification, with the AP(s) 150 utilizing IEEE's 802.11 WLAN specification, and/or with one or more other mobile devices 140 directly utilizing 3GPP's LTE specification, IEEE's 802.11 WLAN specification, and/or one or more other 3GPP and/or non-3GPP protocols. In this example, the serving cell or sector 110 is an LTE serving cell or sector and the WLANs 112 are WLANs utilizing the 802.11 WLAN specification. In an exemplary embodiment, the communication of the mobile device 140 with one or more other mobile devices 140 can be a device-to-device communication that bypasses the base station 120, the AP 150, and/or any other base station and/or AP.

Those skilled in the relevant art(s) will understand that the base station(s) 120, the AP(s) 150, and the mobile device(s) 140 are not limited to these exemplary 3GPP and non-3GPP wireless protocols, and the base station(s) 120, the AP(s) 150, and/or the mobile device(s) 140 can be configured for wireless communications conforming to one or more other 3GPP and/or non-3GPP wireless protocols in addition to, or in the alternative to, the wireless protocols discussed herein.

Examples of the mobile device 140 include (but are not limited to) a mobile computing device—such as a laptop computer, a tablet computer, a mobile telephone or smartphone, a "phablet," a personal digital assistant (PDA), a mobile media player; and a wearable computing device—such as a computerized wrist watch or "smart" watch, and computerized eyeglasses. In some embodiments, the mobile device 140 may be a stationary device, including, for example, a stationary computing device—such as a personal computer (PC), a desktop computer, a computerized kiosk, and an automotive/aeronautical/maritime in-dash computer terminal.

Figure 2:
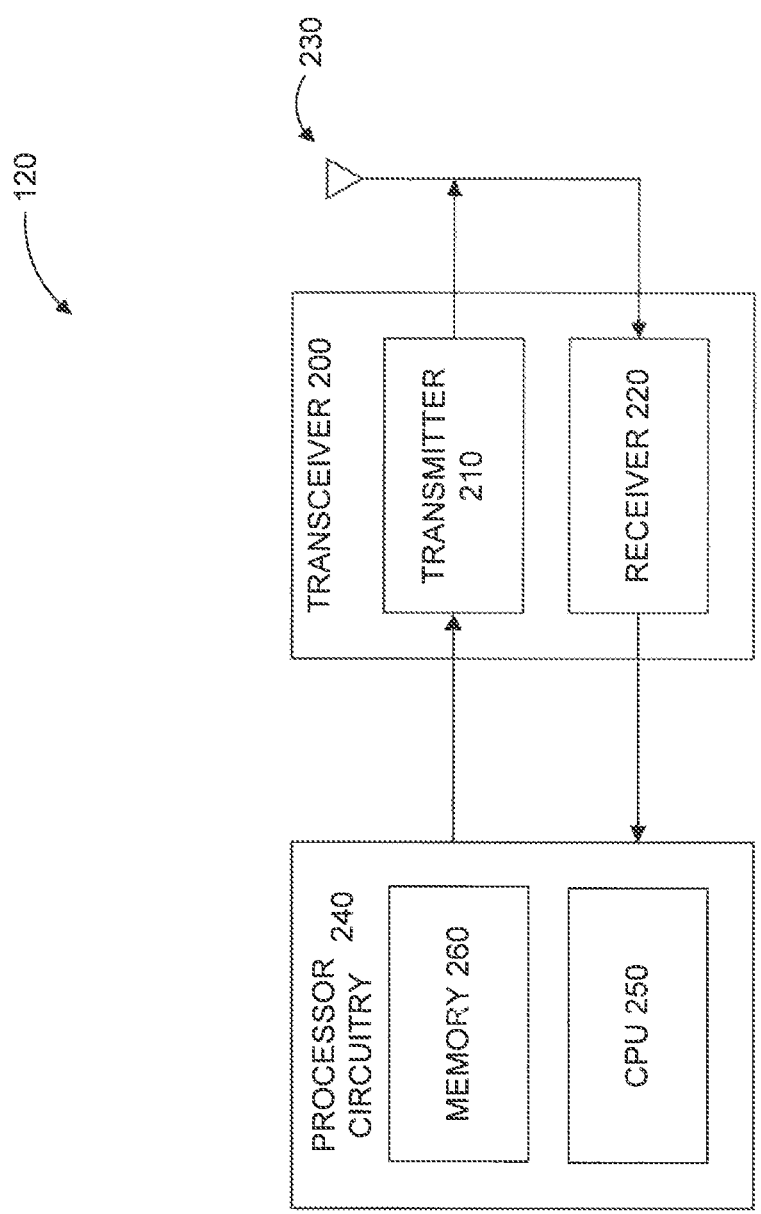
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 communicatively coupled to processor circuitry 240.

The transceiver 200 includes one or more processors, circuitry, and/or logic that is configured to transmit and/or receive wireless communications via one or more wireless technologies within the communication environment 100. In particular, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
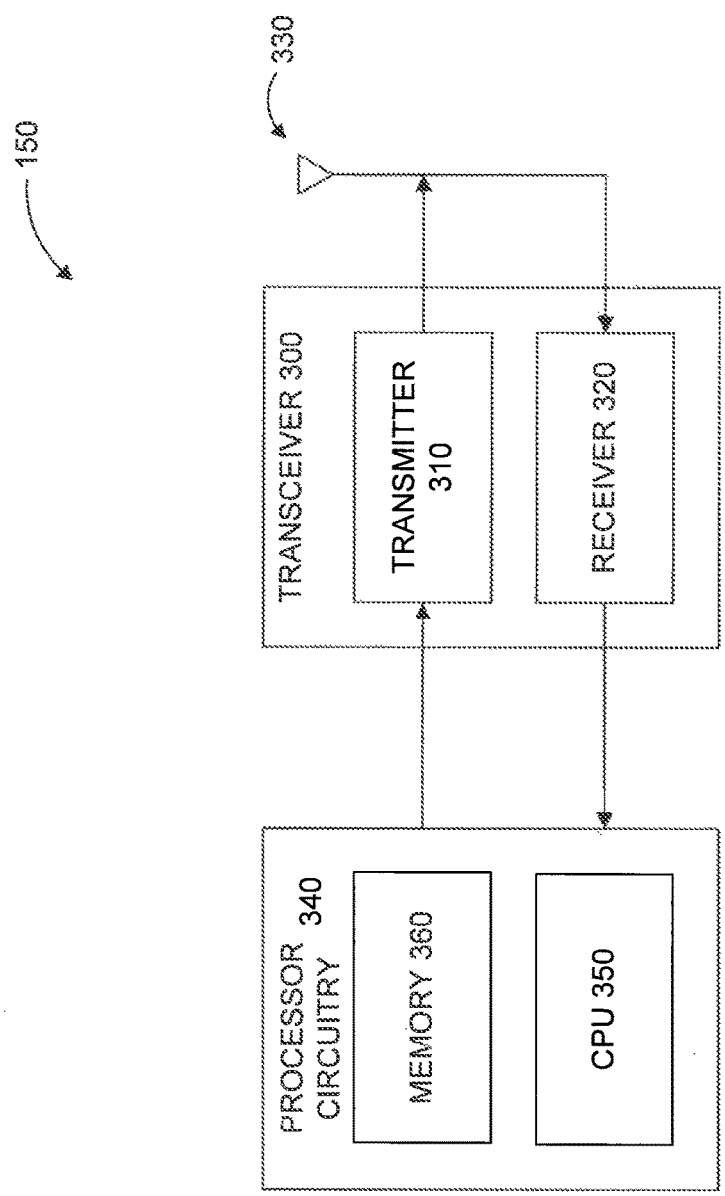
FIG. 3 illustrates an access point according to an exemplary embodiment of the present disclosure.

FIG. 3 illustrates the access point (AP) 150 according to an exemplary embodiment of the present disclosure. For example, the AP 150 can include a transceiver 300 communicatively coupled to processor circuitry 340.

The transceiver 300 is similar to the transceiver 200 and includes one or more processors, circuitry, and/or logic that is configured to transmit and/or receive wireless communications via one or more wireless technologies within the communication environment 100. In particular, the transceiver 300 can similarly include a transmitter 310 and a receiver 320 that have one or more processors, circuitry, and/or logic configured to transmit and receive wireless communications, respectively, via one or more antennas 330. Those skilled in the relevant art(s) will recognize that the transceiver 300 can also include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 330 may include an integer array of antennas, and that the antenna 330 may be capable of both transmitting and receiving wireless communication signals. For example, the AP 150 can be configured for wireless communication utilizing a Multiple-input Multiple-output (MIMO) configuration.

In an exemplary embodiment, the transceiver 300 is configured for wireless communications conforming to one or more non-3GPP protocols. For example, the transceiver 300 is configured for wireless communications conforming to IEEE's 802.11 WLAN specification. In this example, the transceiver 300 can be referred to as WLAN transceiver 300. Those skilled in the relevant art(s) will understand that the transceiver 300 is not limited to communication conforming to IEEE's 802.11 WLAN specification, and can be configured for communications that conform to one or more other non-3GPP protocols and/or one or more 3GPP protocols. It should be appreciated that the transceiver 300 can be referred to by one or more other 3GPP and/or non-3GPP protocols in embodiments where the transceiver 300 is configured for such other communications conforming to the other non-3GPP and/or 3GPP protocols.

The processor circuitry 340 is similar to the processor circuitry 240 and includes one or more processors, circuitry, and/or logic that is configured to control the overall operation of the AP 150, including the operation of the transceiver 300. The processor circuitry 340 can include one or more processors (CPUs) 350 and/or circuits configured to carry out instructions to perform arithmetical, logical, and/or input/output (I/O) operations of the AP 150 and/or one or more components of the AP 150. The processor circuitry 340 can further include a memory 360 that stores data and/or instructions, where when the instructions are executed by the processor(s) 350, perform the functions described herein. The memory 360 can be any well-known volatile and/or non-volatile memory similar to the memory 260 described above. Similarly, the memory 360 can be non-removable, removable, or a combination of both.

Figure 4:
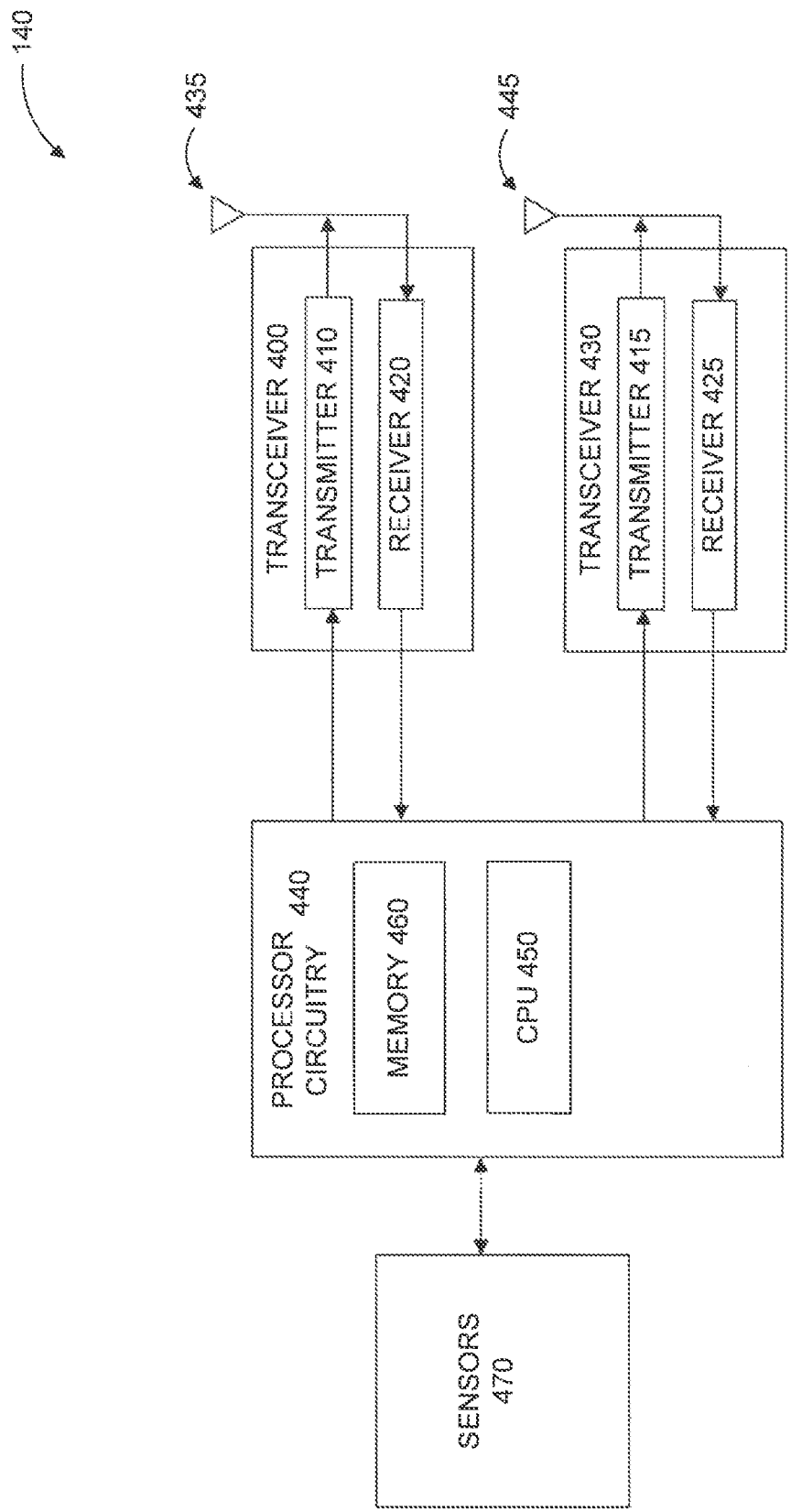
FIG. 4 illustrates a mobile device according to an exemplary embodiment of the present disclosure.

FIG. 4 illustrates the mobile device 140 according to an exemplary embodiment of the present disclosure. The mobile device 140 can include processor circuitry 440 communicatively coupled to an LTE transceiver 400 and a WLAN transceiver 430. The mobile device 140 can be configured for wireless communications conforming to one or more wireless protocols defined by 3GPP and/or one or more non-3GPP wireless protocols. In an exemplary embodiment, the mobile device 140 is configured for wireless communication conforming to 3GPP's LTE specification and for wireless communication conforming to IEEE's 802.11 WLAN specification. Those skilled in the relevant art(s) will understand that the mobile device 140 is not limited to these exemplary 3GPP and non-3GPP wireless protocols, and the mobile device 140 can be configured for wireless communications conforming to one or more other 3GPP and/or non-3GPP wireless protocols in addition to, or in the alternative to, the wireless protocols discussed herein, and/or to a subset of the LTE and WLAN specifications discussed above.

The LTE transceiver 400 includes one or more processors, circuitry, and/or logic that is configured for transmitting and/or receiving wireless communications conforming to 3GPP's LTE specification. In particular, the LTE transceiver 400 can include an LTE transmitter 410 and an LTE receiver 420 that have one or more processors, circuitry, and/or logic configured for transmitting and receiving wireless communications conforming to 3GPP's LTE specification, respectively, via one or more antennas 435. Transceiver 400 need not be limited to LTE, and could operate according to one or more other 3GPP and/or non-3GPP protocols, as will be understood by those skilled in art.

The WLAN transceiver 430 includes one or more processors, circuitry, and/or logic that is configured for transmitting and/or receiving wireless communications conforming to IEEE's 802.11 WLAN specification. In particular, the WLAN transceiver 430 can include a WLAN transmitter 415 and a WLAN receiver 425 that have one or more processors, circuitry, and/or logic configured for transmitting and receiving wireless communications conforming to IEEE's 802.11 WLAN specification, respectively, via one or more antennas 445. Transceiver 430 need not be limited to WLAN, and could operate according to one or more other 3GPP and/or non-3GPP protocols, as will be understood by those skilled in art.

Regarding the LTE transceiver 400 and the WLAN transceiver 430, the processes for transmitting and/or receiving wireless communications can include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that antennas 435 and/or 445 may include an integer array of antennas, and that the antennas may be capable of both transmitting and receiving wireless communication signals. It will also be understood by those skilled in the relevant art(s) that any combination of the LTE transceiver 400 and WLAN transceiver 430, as well as one or more other transceivers, circuits, and/or processors may be embodied in a single chip and/or die.

The processor circuitry 440 includes one or more processors, circuitry, and/or logic that is configured to control the overall operation of the mobile device 140, including the operation of the LTE transceiver 400 and WLAN transceiver 430. The processor circuitry 440 can include one or more processors (CPUs) 450 and/or circuits configured to carry out instructions to perform arithmetical, logical, and/or input/output (I/O) operations of the mobile device 140 and/or one or more components of the mobile device 140. The processor circuitry 440 can further include a memory 460 that stores data and/or instructions, where when the instructions are executed by the processor(s) 450, perform the functions described herein. Similarly, the memory 460 can be any well-known volatile and/or non-volatile memory, and can be non-removable, removable, or a combination of both.

In an exemplary embodiment, the processor circuitry 440 is configured to offload communications via the LTE or WLAN transceivers 400, 430 with one or more base stations 120 and/or APs 150 to one or more other base stations 120 and/or AP 150, to offload communications via the LTE transceiver 400 to the WLAN transceiver 430, and/or to offload communications via the WLAN transceiver 430 to the LTE transceiver 400. The offloading can be based on one or more offloading policies provided to the mobile device 140 by one or more service providers and received via the LTE transceiver 400 and/or the WLAN transceiver 430. Further, the offloading policies can be stored in the memory 460, and accessed and executed by the CPU 450 to effectuate the offloading of communications. For example, the processor circuitry 440 can be configured to control the mobile device 140 to offload communications with the base station 120 to the AP 150.1 based on one or more of the offloading policies. In exemplary embodiments, the offloading policies can include priority information and/or utility information that can be used to determine an appropriate offloading policy to be implemented by the mobile device 140. In these examples, the mobile device 140 can select an offloading policy from one or more offloading polices based on, for example, utility information associated with the offloading policy.

In an exemplary embodiment, the mobile device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile device 140 can include one or more positional and/or movement sensors 470 (e.g., GPS, accelerometer, gyroscope sensor, etc.) implemented in (and/or in communication with) the mobile device 140. Here, the location and/or movement of the mobile device 140 can be determined using one or more transceivers configured for navigation purposes, one or more of the positional and/or movement sensors 470, and/or one or more positional determinations using signal characteristics relative to one or more base stations and/or access points.

In exemplary embodiments of the present disclosure, the communications environment 100 can be configured for inter-system offloading of communications based on one or more offloading policies implemented by the mobile device 140. For example, as discussed above, the offloading policies can define utility information (including one or more utility values) that can be used by the mobile device 140 to effectuate the offloading of communications.

The offloading of communications with the mobile device 140 can be from the base station 120 to the AP 150, from the AP 150 to the base station 120, or a combination of both. For example, the mobile device 140 can be configured to offload communications with the base station 120 to the AP 150 based on one or more offloading policies provided to the mobile device 140 by one or more service providers. The offloading policies can be application specific for separate applications (e.g., voice, data, background, push applications) operating on the mobile device 140. In an exemplary embodiment, the offloading policies are maintained in a policy server that is communicatively coupled to the mobile device 140 via one or more communication networks associated with the one or more service providers. For example, the policy server can be communicatively coupled to the base station 120 (via a backhaul connection), and then wirelessly provided to the mobile device 140 via the LTE network supported by the base station 120.

The offloading policies can be received by the mobile device 140 via the LTE transceiver 400 and/or the WLAN transceiver 430 from the one or more service providers. Further, the offloading policies can be either statically preconfigured on the mobile device 140 or dynamically updated by the service provider and provided to the mobile device 140. The policies can be stored in the memory 460, and accessed and executed by the CPU 450 to effectuate the offloading of communications between the mobile device 140 and base station 120 and/or the AP 150. The offloading policies can include, for example, one or more rules associated with the location of one or more communication networks, priority and/or utility information associated with one or more communication networks and/or one or more applications operable by the mobile device 140, the location of the mobile device 140, the available communication networks at specified locations, the day of week, the time of day, discovery information corresponding to the various communication networks, and/or any other information as would be apparent to those skilled in the relevant arts.

In operation, the mobile device 140 can analyze one or more of the parameters defined in the offloading policy (e.g., utility information) based on the operating state of the mobile device 140 (e.g., which applications are currently being utilized by the mobile device 140). Based on this analysis, the mobile device 140 determines whether to perform an offloading operation to another communication network, and if so, which communications and to what other communication network the communications are to be offloaded to.

In an exemplary embodiment, the one or more offloading policies conform to, and/or are associated with, the Access Network Discovery and Selection Function (ANDSF) framework as defined in the 3GPP TS 24.312 specification, which is incorporated herein by reference in its entirety. The ANDSF framework is an entity introduced by 3GPP as part of the Release 8 set of specifications, within an Evolved Packet Core (EPC) of the System Architecture Evolution (SAE) for 3GPP compliant communication networks. The ANDSF framework assists the mobile device 140 to discover one or more non-3GPP communication networks (e.g., WLAN, WIMAX, etc.) that can be used for data communications in addition to one or more 3GPP communication networks (e.g., LTE, HSPA, etc.) and to provide the mobile device 140 with rules (e.g., policy conditions) that control the connection to the 3GPP and/or non-3GPP communication networks. The use of operational parameters, policies, and/or conditions within an operational framework for inter-system offloading, and the transmission of the operational framework to a mobile device, is further described in U.S. patent application Ser. No. 14/149,681 filed Jan. 7, 2014, entitled "Systems And Methods For Network Discovery And Selection Using Contextual Information," and U.S. patent application Ser. No. 14/167,615 filed Jan. 29, 2014, entitled "System And Methods For Anonymous Crowdsourcing Of Network Condition Measurements," each of which is incorporated herein by reference in its entirety.

The ANDSF framework is defined by one or more ANDSF Management Objects (MO) that are generated by the service providers of the one or more 3GPP communication networks and provided to the mobile device 140. The ANDSF MOs of the framework can provide the mobile device 140 with the following information, based on the service provider's configuration:

1. Inter-System Mobility Policy (ISMP)—network selections rules for a mobile device with no more than one active communication network connection (e.g., either LTE or WLAN).
2. Inter-System Routing Policy (ISRP)—network selection rules for the mobile device with potentially more than one active communication network connection (e.g., both LTE and WLAN). Here, the mobile device may employ IP Flow Mobility (IFOM), Multiple Access Packet Data Networks (PDN) Connectivity (MAPCON) or non-seamless WLAN offloading according to operator policy and user preferences.
3. Discovery Information—a list of networks that may be available in the vicinity of the mobile device and information assisting the mobile device to expedite the connection to these networks.

In these examples, the ANDSF framework assists the mobile device 140 to discover communication networks in the vicinity of the mobile device 140 and prioritize/manage connections to the communication networks. The policies set forth in the ANDSF framework can be statically pre-configured on the mobile device or dynamically updated by the service provider and provided to the mobile device 140 via the Open Mobile Alliance (OMA) Device Management (DM) protocol specified by the OMA DM Working Group and the Data Synchronization (DS) Working Group. The OMA DM protocol is incorporated herein by reference in its entirety.

The ANDSF framework can be referred to as an ANDSF Management Object (MO) that include various rules, conditions, parameters, and other information organized into one or more "nodes" that may have one or more "leaf objects" descending therefrom. The nodes and leaf objects define, for example, one or more rules, one or more conditions, one or more parameters, and/or discovery information that are used by the mobile device 140 in governing the ISMP, ISRP, and/or Discovery processing by the mobile device 140. For example, the ANDSF MO is used by the mobile device 140 to establish communications via one or more non-3GPP communication networks (e.g., WLAN communication network on AP 150) and effectuate offloading of the mobile device's 140 communications via the base station 120 to, for example, the AP 150.

The ANDSF MOs can be maintained by an ANDSF server that is communicatively coupled to the mobile device 140 via one or more communication networks associated with the one or more service providers (e.g., via the base station 120). The various rules and information within the ANDSF MO can be either statically pre-configured on the mobile device 140 or dynamically updated by the service provider and provided to the mobile device 140. The ANDSF MO can be stored in the memory 460 of the mobile device 140, and accessed and executed by the CPU 450 to effectuate the offloading of communications between the mobile device 140 and base station 120 and/or the AP 150.

Figure 5:
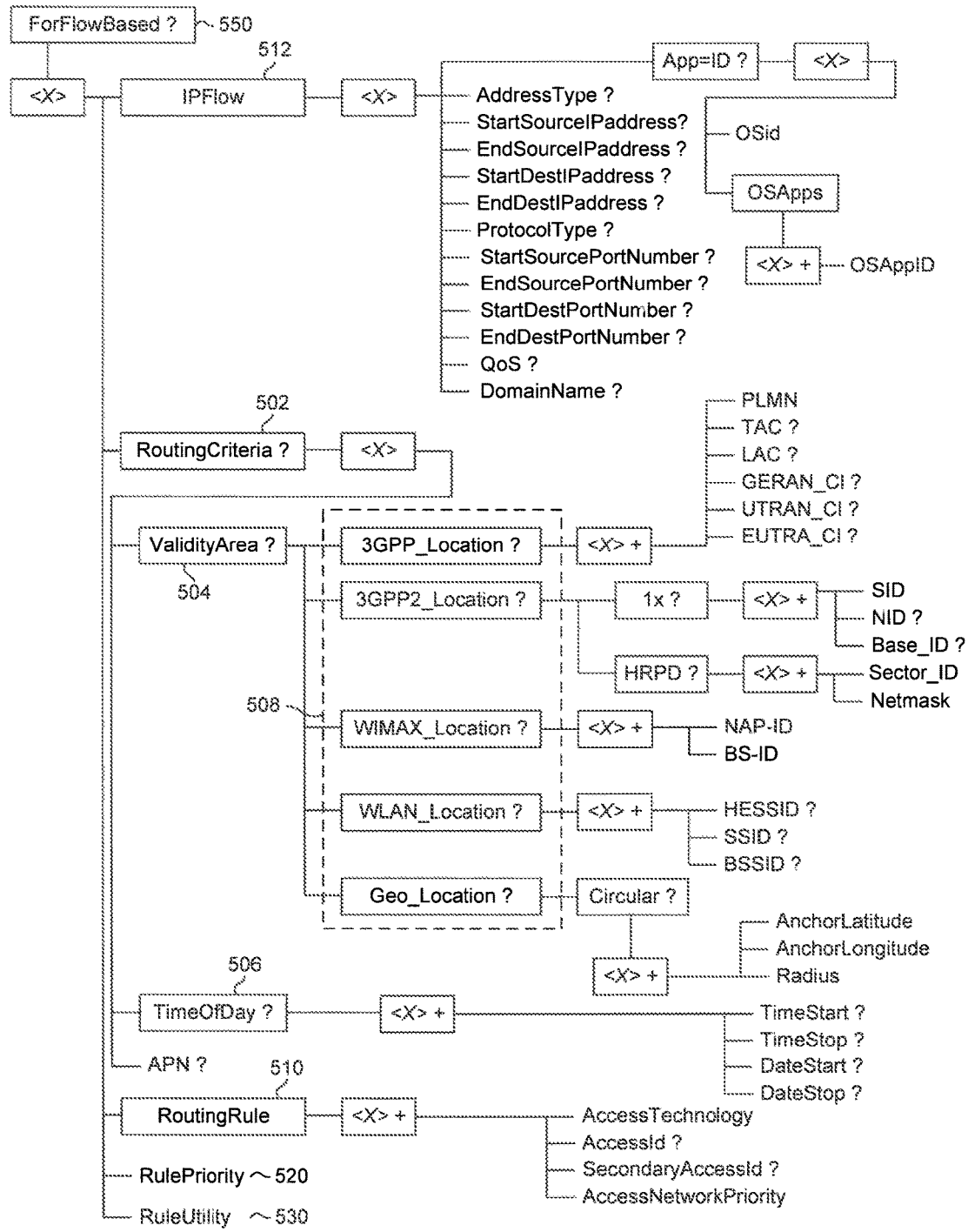
FIG. 5 illustrates a management framework according to an exemplary embodiment of the present disclosure.

In operation, with reference to FIG. 5, when a condition within the ANDSF MO becomes "active" (e.g., the mobile device 140 moves within range of a communication network serving cell that is specified in a node/leaf of the of the ANDSF MO), the mobile device 140 notifies the event to the ANDSF server and requests the inter-system Discovery Information based on the preferred access technology recommended in the MO (e.g., Wi-Fi). The ANDSF server will provide the mobile device 140 with the communication network's identification information (e.g., Wi-Fi Hotspot SSIDs) in the vicinity and related access information (e.g., Wi-Fi security keys). The mobile device 140 uses this information to connect to the other communication network. Further, the mobile device 140 can offload communications originally destined for the original serving communication network (e.g., LTE) to the other communication network based on rules set forth in the ANDSF MO.

In exemplary embodiments, identification information, connection information, backhaul bandwidth and/or data rate information, capability information, and/or any other information associated with the AP(s) 150 as would be understood by those skilled in the relevant arts can be provided by the AP(s) 150 to the mobile device(s) 140 utilizing the Access Network Query Protocol (ANQP). In exemplary embodiments, the AP(s) can be configured to provide information to the base station(s) 120 through one or more backhaul connections. The information provided to the base stations 120 can include information that can be provided by the AP(s) 150 to mobile device(s) 140 using the Access Network Query Protocol (ANQP). For example, the AP(s) 150 can provide identification information, connection information, backhaul bandwidth and/or data rate information, capability information, and/or any other information associated with the AP(s) 150 to the base station(s) 120 through the backhaul connection. In these examples, the information provided to the base station(s) 120 that are generally provided by the AP(s) 150 using the ANQP can be referred to one or more ANQP parameters.

The base station(s) 120 can be configured to then provide the information obtained from the AP(s) (e.g., the ANQP parameters) to the mobile device(s) 140 using a radio access network (e.g., LTE network). In these examples, the mobile device(s) 140 can utilize the information associated with the AP(s) 150 that has been received via the base station(s) 120 to connect to, and communicate with, the AP(s) 150. In an exemplary embodiment, the ANQP parameters can be defined in an ANDSF framework and distributed to the mobile device(s) 140 within an ANDSF MO.

In exemplary embodiments, the AP(s) 150 that are configured to exchange information with one or more base station(s) 120 can be associated with one or more service providers that are associated with the corresponding base station(s) 120. That is, the exchange of information between the AP(s) 150 and base station(s) 120 can be effectuated by a common service provider that supports both the AP 150 and the base station 120.

FIG. 5 illustrates an example ANDSF Management Object (MO) 500 according to exemplary embodiments of the present disclosure. The ANDSF MO 500 can be implemented by the mobile device 140, base station 120 and/or APs 150 as described herein.

The ANDSF MO 500 provides an offloading framework that includes various rules/conditions and information organized into one or more "nodes," where each node may have one or more "leaf objects." The nodes are organized into a hierarchy with one or more nodes having one or more decedent nodes. It should also be appreciated that the one or more nodes may not have any decedent nodes. The last node in a hierarchal branch can include one or more leaf objects that define a rule and/or contain information associated with a corresponding communication network. For example, the nodes and leaf objects define the various rules and discovery information that are used by the mobile device 140 in governing the ISMP, ISRP, and Discovery processing by the mobile device 140. The ANDSF MO 500 is not limited to the nodes, leaves, and the organization of such nodes/leaves as described and illustrated herein. As would be understood by those skilled in the relevant arts, the ANDSF MO 500 can include different nodes and/or leaves, in addition to, or in the alternative to, the nodes and/or leaves described herein, and the various nodes and/or leaves can be arranged and/or structured differently than described and illustrated herein without departing from the spirit and scope of the present disclosure.

In an exemplary embodiment, the ANDSF MO 500 includes one or more nodes and/or leaf objects having portions of which that are defined in the 3GPP TS 24.312 specification. For example, the ANDSF MO 500 includes ForFlowBased node 550, IPFlow node 512, RulePriority leaf 520, and RoutingCriteria node 502, which includes the following decedent nodes: ValidityArea 504 and TimeOfDay 506 that are previously defined in the 3GPP TS 24.312 specification. Other nodes and/or leaves, including the RuleUtility leaf 530, are not currently defined in the 3GPP specification and are added herein according to exemplary embodiments of the disclosure.

ForFlowBased node 550 is a placeholder for validity conditions for one or more data distribution rules for accesses based on flow description. The RoutingCriteria node 502 is a placeholder for validity conditions for one or more flow distribution rules. The IPFlow node 512 is a placeholder for validity conditions for one or more flow descriptions. The ValidityArea node 504 is a placeholder for location conditions for one or more flow distribution rules. The ValidityArea node 504 can include one or more decedent nodes, including (but not limited to): 3GPP_Location, 3GPP2_Location, WiMAX_Location, WLAN_Location, and Geo_Location. For the purposes of this discussion, the decedent nodes of the ValidityArea node 504 can collectively be referred to as "location nodes" 508. Each of the various nodes within the location nodes 508 can further include one or more leaf objects, or one or more decedent nodes having one or more leaf object descending therefrom. For example, the WLAN_Location node can include leaf objects HESSID (homogenous extended service set identifier), BSSID (basic service set identifier), and SSID (service set identifier). The HESSID is a media access control (MAC) address that is the same on all access points belonging to a particular network. Similarly, the BSSID and SSID are identifiers used to identify the basic service set (e.g., an access point and one or more stations). For example, BSSID uniquely identifies the basic service set (BSS) and is a MAC address of the wireless access point generated by combining the 24 bit Organization Unique Identifier (e.g., the manufacturer's identity) and the manufacturer's assigned 24-bit identifier for the radio chipset in the access point. The SSID is 1 to 32 byte string and is typically a human-readable string commonly called the "network name." The HESSID, BSSID and SSID are further defined in the IEEE 802.11 standard, which is incorporated herein in its entity.

The TimeOfDay node 506 indicates the time of day condition. The time of day condition is considered valid ("active") if the time of day in the current time zone, as indicated by the mobile device 140, matches at least one time interval indicated in the TimeOfDay node 510. That is, the time of day satisfies one or more of the leaf objects of the TimeOfDay node 506. The RoutingRule node 510 is a placeholder for validity conditions that indicate the preferred access for a flow distribution, including the preferred access technologies (e.g., 3GPP, WLAN, etc.)

TheRulePriority leaf 520 is a placeholder for validity conditions that represent the priority given to flow distribution rule(s) and is represented as one or more numerical values. In exemplary embodiments, the RulePriority leaf 520 includes the priority values discussed above with respect to Table 1. In operation, the RulePriority leaf 520 is used to establish which flow description rule applies for data traffic matching multiple flow distribution rules. For example, the flow description rule (e.g., the base station 120 or AP 150 for a desired application) with the lowest priority value can be applied. That is, the mobile device 140 can be configured to treat the rule with the lowest priority value as the rule having the highest priority. As discussed above, the priority values can be used to determine whether to offload communications associated with one or more applications to another base station 120 and/or AP 150.

In an exemplary embodiment, the ANDSF MO 500 also includes RuleUtility leaf 530, which is not currently defined in 3GPP TS specification. The RuleUtility leaf 530 is a placeholder for validity conditions that represent the priority given to flow distribution rule(s) and is represented as one or more numerical values. In exemplary embodiments, the RuleUtility leaf 530 includes one or more utility values and/or utility sum values discussed above with respect to Tables 2-4. In these examples, when the Rule Utility leaf 530 includes one or more utility values (without one or more utility sum values), the mobile device 140 is configured to calculate the utility sum value(s) based on utility values defined in RuleUtility leaf 530. In embodiments where the RuleUtility leaf 530 includes one or more utility sum values (in addition to, or instead of including only utility values), the mobile device 140 can be configured to utilize the defined utility sum values as discussed above and/or can be configured to calculate one or more utility sum values based on one or more utility values defined in the RuleUtility leaf 530. By using the RuleUtility leaf 530, selection of an appropriate base station 120 and/or AP 150 is improved through the utilization of utility sum values in scenarios where two or more applications are being utilized by the mobile device 140.

In operation, the RuleUtility leaf 530 is used to establish which flow description rule applies for data traffic matching multiple flow distribution rules. For example, the flow description rule (e.g., the base station 120 or AP 150 for a desired application) with the highest utility value can be applied. That is, the mobile device 140 can be configured to select the rule with the highest utility value to provide the offloading operations that provide the highest quality of service for the active applications.

In an exemplary embodiment, the mobile device 140 is configured to offload communications originally destined for the original serving communication network (e.g., LTE) to another communication network (e.g., WLAN) based the state of one or more of nodes and/or leaves defined in the ANDSF MO 500. For example, the mobile device 140 can utilize the location information associated with the ValidityArea node 504, and particularly, with the location nodes 508, to determine whether the mobile device 140 is within range of the other (prospective) communication network in which potential offloading can be performed. Further, the mobile device 140 can utilize the RuleUtility leaf 530 to determine whether to perform an offloading operation to another communication network, and if so, which communications and to what other communication network the communications are to be offloaded to. For example, if the mobile device 140, utilizing one or more of the location nodes 508, determines that the mobile device 140 is within range of APs 150, the mobile device 140 can determine utility sum values based on the application(s) being utilized by the mobile device 140 for the APs 150 and/or the base station 120. Based on the utility sum values, the mobile device 140 can determine which of the base station(s) 120 and/or AP(s) 150 should offer the highest quality of service for the utilized application(s). The mobile device 140 can then offload communications associated with the utilized application(s) to the appropriate base station 120 and/or AP 150.

Figure 6:
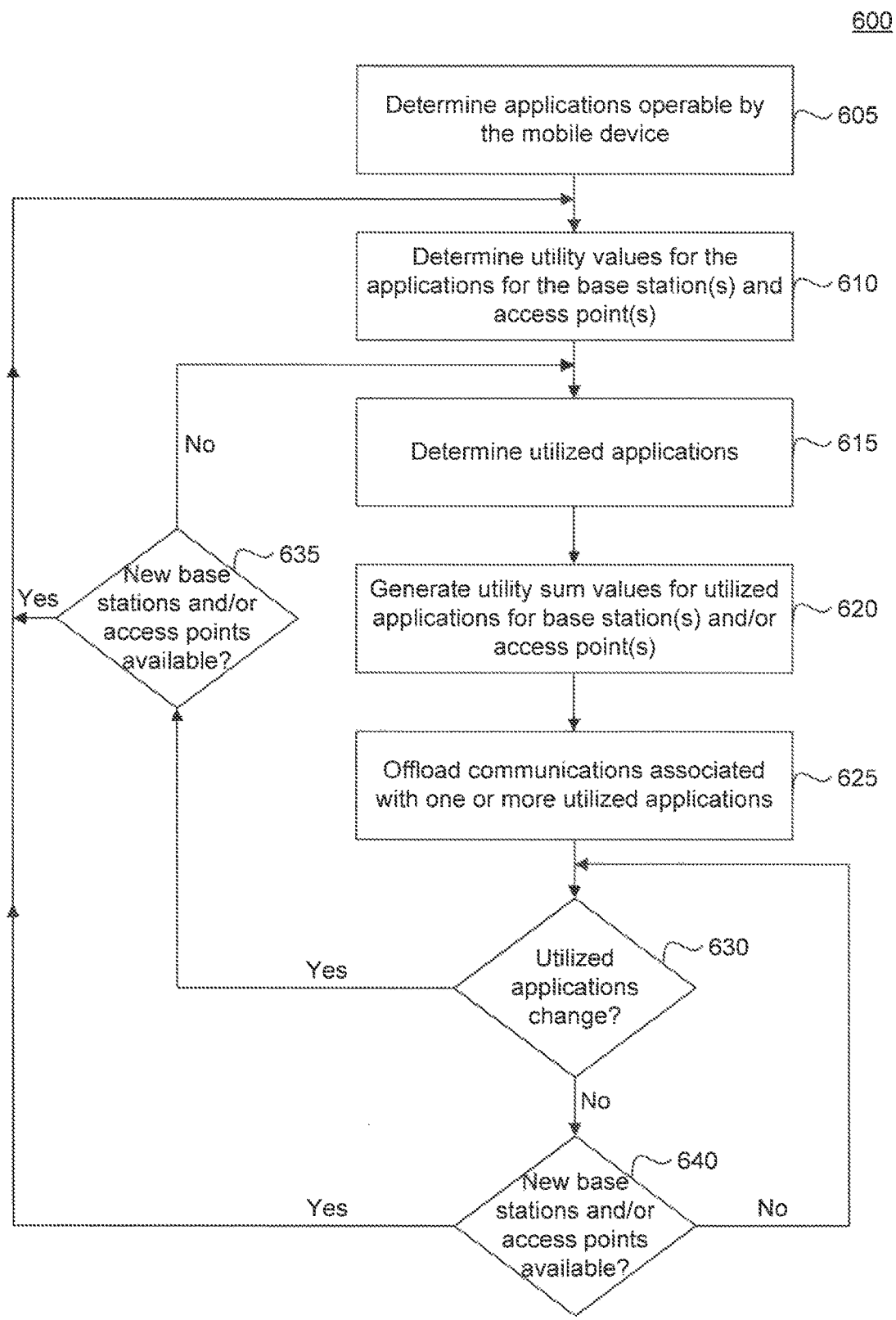
FIG. 6 illustrates a flowchart of an offloading method according to an exemplary embodiment of the present disclosure.

FIG. 6 illustrates a flowchart 600 of an offloading method in accordance with an exemplary embodiment of the present disclosure. The method of flowchart 600 is described with continued reference to one or more of FIGS. 1-5. The steps of the method of flowchart 600 are not limited to the order described below, and the various steps may be performed in a different order. Further, two or more steps of the method of flowchart 600 may be performed simultaneously with each other.

The method of flowchart 600 begins at step 605, where the applications that are operable by the mobile device 140 are determined. For example, the mobile device 140 can determine applications that are supported by the mobile device. The applications can include, for example, voice call applications, background applications, push applications, etc.

After step 605, the flowchart 600 transitions to step 610, where utility values for the supported applications are determined for one or more base stations 120 and/or one or more APs 150. In these examples, the utility values can be defined by one or more service providers and the mobile device 140 can determine the utility values from information provided to the mobile device 140 by the service providers. In exemplary embodiments, the utility values are defined in an ANDSF framework, which is provided to the mobile device 140. In these examples, the mobile device 140 can be configured to determine the utility values from information set forth in the ANDSF framework as described herein.

After step 610, the flowchart 600 transitions to step 615, where utilized applications are determined. In an exemplary embodiment, the mobile device 140 can determine which applications are to be utilized or are currently being utilized. For example, if the mobile device 140 determines that a voice call and a background download are to be performed or are being performed, the mobile device 140 can determine that a voice call application and a background application are to be utilized.

After step 615, the flowchart 600 transitions to step 620, where the utility values corresponding to the utilized applications for the base station 120 and/or APs 150 are added together to generate one or more utility sum values. For example, if a voice call application and a background application are to be utilized, the respective utility values for these applications can be added together for the base station 120 to generate a utility sum value for the base station 120, the respective utility values for these applications can be added together for the AP 150.1 to generate a utility sum value for the AP 150.1, and the respective utility values for these applications can be added together for the AP 150.2 to generate a utility sum value for the AP 150.2. The utility sum values can include utility values from a combination of communication networks, e.g., a combination of utility values are selected from a diversity of communications networks (base station 120, APs 150) to provide appropriate support for the utilized applications. For example, with reference to Table 3, the utility sum value 150 results from the combination of LTE to support voice calls, and WLAN B to support background and push applications. Further, a comparison of the utility sum values resulting from the various combinations of communications networks can be performed to select the appropriate combination of networks to support the utilized applications. In an exemplary embodiment, the mobile device 140 is configured to generate the utility sum values for the corresponding base station(s) 120 and/or AP(s) 150 based on the utility values, which may include a combination of utility values corresponding to the base station(s) 120 and/or AP(s) 150. In another embodiment, the utility sum values can be generated (e.g., by the service provider) and provided to the mobile device(s) 140.

After step 620, the flowchart 600 transitions to step 625, where an offloading operation is performed to offload communications associated with one or more applications. For example, the mobile device 140 can utilize the utility sum values to rank the various base stations 120 and APs 150 for the active applications. Based on the rankings, the mobile device 140 can be configured to utilize the base station 120 for the communications (i.e., not offload the communications), to offload one or more communications associated with one or more respective applications to one or the APs 150 while retaining one or more communications associated with one or more respective applications, or to offload all the communications associated with the active applications to one of the APs 150.

After step 625, the flowchart 600 transitions to step 630, where it is determined whether the utilized applications have changed. For example, the mobile device 140 can be configured to determine if the number of currently utilized applications is change. That is, in exemplary embodiments, the utility sum values can be dynamically calculated when the applications that are being utilized change. In exemplary embodiments, the mobile device 140 is configured to determine when the utilized applications change.

If the mobile device 140 determines that the utilized applications are to change (YES at step 630), the flowchart 600 transitions to step 635, where it is determined if the available base stations 120 and/or APs 150 have changed. Similar to the change in utilized applications, the utility sum values can be dynamically calculated when the available base stations 120 and/or APs 150 change. For example, if the mobile device 140 enters the coverage area of another AP 150, the utility sum values can be recalculated to include the new AP 150 as another potential recipient of offloaded communications.

If the mobile device determines that the available base stations 120 and/or APs 150 have changed (YES at step 635), the flowchart 600 returns to step 610. Otherwise (NO at step 635), the flowchart 600 returns to step 615.

If the mobile device 140 determines that the utilized applications are to remain constant (NO at step 630), the flowchart 600 transitions to step 640, where it is determined if the available base stations 120 and/or APs 150 have changed similar to step 635. If the mobile device 140 determines that the available base stations 120 and/or APs 150 have changed (YES at step 640), the flowchart 600 returns to step 610. Otherwise (NO at step 640), the flowchart 600 returns to step 630.

Figure 7:
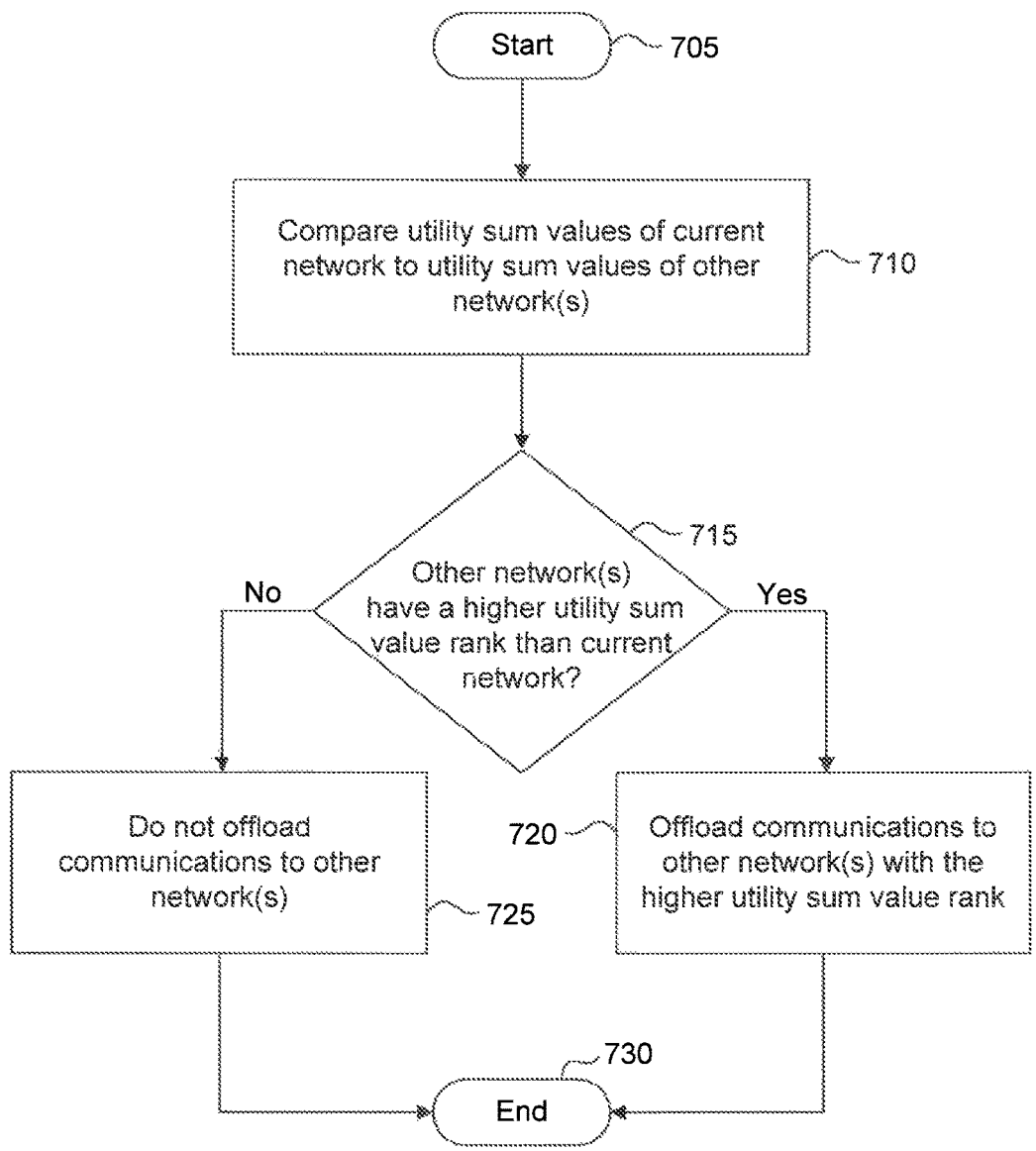
FIG. 7 illustrates a flowchart of an offloading method according to an exemplary embodiment of the present disclosure.

FIG. 7 illustrates a flowchart 700 of an offloading method in accordance with an exemplary embodiment of the present disclosure. The method of flowchart 700 is described with continued reference to one or more of FIGS. 1-6, and farther describes the offloading operation of step 625 of the flowchart 600 of FIG. 6.

The steps of the method of flowchart 700 are not limited to the order described below, and the various steps may be performed in a different order. Further, two or more steps of the method of flowchart 700 may be performed simultaneously with each other.

The method of flowchart 700 begins at step 705 and transitions to step 710, where utility sum values of the network(s) currently supporting communications of the mobile device (e.g., LTE network of base station 120) are compared to the utility sum values of one or more other networks (e.g., WLANs of AP 150.1 and 150.2). In an exemplary embodiment, the comparison of the utility sum values can be used to rank the offloading scenarios corresponding to the utility sum values. For example, the mobile device 140 can be configured to compare the various utility sum values and rank available base stations 120 and/or APs 150 based on their corresponding utility sum values.

After step 710, the flowchart 700 transitions to step 715, where it is determined whether one or more of the utility sum values for the available base stations 120 and/or APs 150 have a higher rank (e.g., have a higher utility sum value) than the network currently supporting the mobile device 140. In an exemplary embodiment, the mobile device 140 can be configured to compare and current network's rank (e.g., utility sum value) to the ranks (e.g., utility sum values) of the other networks to determine if one or more other networks are conducive for the offloading of communications.

If the mobile device 140 determines that one or more available base stations 120 and/or APs 150 are ranked higher than the current network (YES at step 715), the flowchart 700 transitions to step 720, where one or more communications (associated with the utility sum values) are offloaded to one of the other networks. After step 720, the flowchart 700 transitions to step 730 where the flowchart 700 ends.

If the mobile device 140 determines that the current network has the highest rank (e.g., the highest utility sum value) when compared to the available base stations 120 and/or APs 150 (NO at step 715), the flowchart 700 transitions to step 725, where the communications are not offloaded to another network. After step 725, the flowchart 700 transitions to step 730 where the flowchart 700 ends.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
   a first transceiver configured to communicate with first and second communication networks;
   a second transceiver configured to communicate with a third communication network; and
   processor circuitry communicatively coupled to the first and the second transceivers, the processor circuitry being configured to:
      receive an offloading framework, the offloading framework defining utility information associated with the first, the second, and the third communication networks;
      determine a plurality of applications being utilized by the communication device;
      determine a first set of utility values of the utility information corresponding to the plurality of applications, the first set of utility values being associated with the first communication network;
      generate a first utility sum value based on a sum of the first set of utility values;
      determine a second set of utility values of the utility information corresponding to the plurality of applications, the second set of utility values being associated with the second communication network;
      generate a second utility sum value based on a sum of the second set of utility values;
      determine a third set of utility values of the utility information corresponding to the plurality of applications, the third set of utility values being associated with the third communication network;
      generate a third utility sum value based on a sum of the third set of utility values; and
      offload communications from the third communication network to one of the first communication network or the second communication network based on the first, the second, and the third utility sum values,
   wherein at least one of the first utility sum value, the second utility sum value, or the third utility sum value are dynamically calculated when one of the first communication network the second communication network, or the third communication becomes unavailable.

2. The communication device of claim 1, wherein the offloading framework conforms to an Access Network Discovery and Selection Function (ANDSF) framework.

3. The communication device of claim 1, wherein the processor circuitry is further configured to:
   compare the first, the second, and the third utility sum values; and
   offload the communications based on the comparison of the first, the second, and the third utility sum values.

4. The communication device of claim 1, wherein the third communication network is a Long-Term Evolution (LTE) communication network, and the first and the second communication networks are wireless local area networks.

5. The communication device of claim 1, wherein the processor circuitry is configured to receive the offloading framework via the third communication network.

6. The communication device of claim 1, wherein at least one of the first set of utility values, the second set of utility values, or the third set of utility values are determined from information provided to the communication device from the first communication network, the second communication network, or the third communication network, respectively.

7. The communication device of claim 1, wherein at least one of the first utility sum value, the second utility sum value, or the third utility sum value are dynamically calculated when one of the plurality of applications becomes unutilized.

8. A communication device, comprising:
   a first transceiver configured to communicate with first and second communication networks;
   a second transceiver configured to communicate with a third communication network; and
   processor circuitry communicatively coupled to the first and the second transceivers, the processor circuitry being configured to:
      receive an offloading framework, the offloading framework defining utility information associated with the first, the second, and the third communication networks;
      determine a plurality of applications being utilized by the communication device;
      determine a first set of utility values of the utility information corresponding to the plurality of applications, the first set of utility values being associated with the first communication network;
      determine a second set of utility values of the utility information corresponding to the plurality of applications, the second set of utility values being associated with the second communication network;
      determine a third set of utility values of the utility information corresponding to the plurality of applications, the third set of utility values being associated with the third communication network;
      generate a first utility sum value based on the first set of utility values and the third set of utility values;
      generate a second utility sum value based on the second set of utility values and the third set of utility values;
      generate a third utility sum value based on the third set of utility values; and
      offload communications from the third communication network to one of the first communication network or the second communication network based on the first, the second, and the third utility sum values.

9. The communication device of claim 8, wherein the processor circuitry is further configured to:
   compare the first, the second, and the third utility sum values; and
   offload the communications based on the comparison of the first, the second, and the third utility sum values.

10. The communication device of claim 9, wherein the processor circuitry is further configured to:
    communicate, via the third communication network and using the second transceiver, a communication associated with a first application of the plurality of applications; and
    offload a communication associated with a second application of the plurality of applications from the third communication network to one of the first communication network or the second communication network.

11. The communication device of claim 10, wherein the processor circuitry is further configured to:
    offload the communication associated with the second application of the plurality of applications based on the comparison of the first, the second, and the third utility sum values.

12. The communication device of claim 8, wherein at least one of the first utility sum value, the second utility sum value, or the third utility sum value are dynamically calculated when one of the plurality of applications becomes unutilized.

13. The communication device of claim 8, wherein at least one of the first utility sum value, the second utility sum value, or the third utility sum value are dynamically calculated when one of the first communication network, the second communication network, or the third communication becomes unavailable.

14. The communication device of claim 8, wherein the offloading framework conforms to an Access Network Discovery and Selection Function (ANDSF) framework.

15. A communication method using a mobile device, the method comprising:
 receiving an offloading framework, the offloading framework defining utility information associated with a first communication network, a second communication network, and a third communication network;
 determining a plurality of applications being utilized by the mobile device;
 determining a first set of utility values of the utility information corresponding to the plurality of applications, the first set of utility values being associated with the first communication network;
 determining a second set of utility values of the utility information corresponding to the plurality of applications, the second set of utility values being associated with the second communication network;
 determining a third set of utility values of the utility information corresponding to the plurality of applications, the third set of utility values being associated with the third communication network;
 generating a first utility sum value based on the first set of utility values and the third set of utility values;
 generating a second utility sum value based on the second set of utility values and the third set of utility values;
 generating a third utility sum value based on the third set of utility values; and
 offloading communications to the first communication network or the second communication network from the third communication network based on the first, the second, and the third utility sum values.

16. The communication method of claim 15, wherein the offloading framework conforms to an Access Network Discovery and Selection Function (ANDSF) framework.

17. The communication method of claim 15, wherein the offloading further comprises:
 comparing the first, the second, and the third utility sum values; and
 offloading the communications from the third communication network to one of the first or the second communication networks based on the comparison of the first, the second, and the third utility sum values.

18. The communication method of claim 15, wherein the third communication network is a Long-Term Evolution (LTE) communication network, and the first and the second communication networks are wireless local area networks.

19. The communication method of claim 15, wherein at least one of the first utility sum value, the second utility sum value, or the third utility sum value are dynamically calculated when one of the plurality of applications becomes unutilized.

20. The communication method of claim 15, wherein at least one of the first utility sum value, the second utility sum value, or the third utility sum value are dynamically calculated when one of the first communication network, the second communication network, or the third communication becomes unavailable.

* * * * *

UNITED STATES PATENT AND TRADEMARK OFFICE
CERTIFICATE OF CORRECTION

PATENT NO. : 9,775,085 B2
APPLICATION NO. : 14/245761
DATED : September 26, 2017
INVENTOR(S) : Kalapatapu et al.

It is certified that error appears in the above-identified patent and that said Letters Patent is hereby corrected as shown below:

In Column 23, Line 42, in Claim 1 replace "the third communication becomes" with --the third communication network becomes--.

In Column 25, Lines 5-6, in Claim 13 replace "the third communication becomes" with --the third communication network becomes--.

In Column 26, Lines 31-32, in Claim 20 replace "the third communication becomes" with --the third communication network becomes--.

Signed and Sealed this
Twenty-fourth Day of April, 2018

Andrei Iancu
*Director of the United States Patent and Trademark Office*